United States Patent [19]

Tsuchiya

[11] Patent Number: 5,086,359
[45] Date of Patent: Feb. 4, 1992

[54] CASSETTE TAPE SLACK-PREVENTING APPARATUS FOR USE IN MAGNETIC RECORDING/REPRODUCING APPARATUS

[75] Inventor: Yuzo Tsuchiya, Fukaya, Japan
[73] Assignee: Kabushiki Kaisha Toshiba, Kawasaki, Japan
[21] Appl. No.: 472,189
[22] Filed: Jan. 30, 1990
[30] Foreign Application Priority Data Jan. 31, 1989 [JP] Japan ..................... 1-19652

[51] Int. Cl.⁵ ................. G11B 15/18; G11B 17/00; G11B 19.02
[52] U.S. Cl. .......................... 360/71; 360/85; 360/96.3
[58] Field of Search ............... 360/71, 95, 96.3, 85

[56] References Cited
U.S. PATENT DOCUMENTS
4,959,739 9/1990 Tsutsumi ..................... 360/95

Primary Examiner—A. J. Heinz
Attorney, Agent, or Firm—Cushman, Darby & Cushman

[57] ABSTRACT

A cassette tape slack-preventing apparatus to prevent magnetic tape from becoming slack when inserted into a video tape recorder in which the capstan motor drives the reel bases as well as the cassette loading mechanism. Mode switching cams are used to detect if a front loading mechanism is in operating and keeps the reel bases from rotating through linkages to the cams.

7 Claims, 9 Drawing Sheets

CASSETTE TAPE SLACK-PREVENTING APPARATUS FOR USE IN MAGNETIC RECORDING/REPRODUCING APPARATUS

BACKGROUND OF THE INVENTION

1. Field of the Invention

The present invention relates to a cassette tape slack-preventing apparatus which is adapted for use in a magnetic recording/reproducing apparatus, such as a video tape recorder (VTR), wherein a capstan motor drives both a front loading mechanism and a tape-driving mechanism.

2. Description of the Related Art

As is well known, a helical scan VTR is provided with both a front loading mechanism and a tape-loading mechanism. When a video tape cassette containing a video tape is horizontally inserted into the cassette insertion port formed in the front face of the VTR, the front loading mechanism receives the cassette by means of a cassette holder and draws the cassette inside together with the cassette holder, and then lowers the cassette until it comes to the predetermined cassette-loading position. When the cassette is being lowered, its cover is opened, and the tape-pulling members of the tape-loading mechanism are inserted into the cassette and brought into contact with the inner side of the tape. Next, the tape-loading mechanism causes the tape-pulling members to pull the tape out of the cassette placed at the cassette-loading position and guides the tape such that it is in contact with about half of the circumference of the rotating cylinder. After the tape-loading mechanism sets the tape along the tape feed path in this way, various operation modes, such as recording, play, freeze (i.e., still image reproduction), slow play, fast-forward play, fast-rewind play, fast forward, and fast rewind, are selectively established with a mode-establishing mechanism and its associated circuits. If an eject key is operated, the tape-loading mechanism draws the tape back into the cassette, and the front loading mechanism returns the cassette from the cassette-loading position to the cassette insertion port.

With the recent trend toward miniaturization, it is demanded that the structural components of this type of magnetic recording/reproducing apparatus be simplified and reduced in both number and weight, without adversely affecting the ability to control the operation with high accuracy.

In a conventional VTR, the front loading mechanism for moving a tape cassette to the predetermined tape-loading position, the tape-loading mechanism for pulling the tape out of the tape cassette and bringing the tape into contact with the cylinder, and the tape-driving mechanism for driving the loaded tape are all driven or controlled by use of different motors specially designed for their respective purposes. Since each of these specially-designed motors can be controlled with high accuracy independently of the others, the operation of the driven-components of the VTR can be controlled with high accuracy. Due to the use of the specially-designed motors, however, the construction of the conventional VTR cannot be easily reduced in size or weight. It is therefore to difficult to manufacture a simple, light-in-weight VTR which meets the recent trend toward miniaturization.

Under the circumstances, it is thought to combine the front loading mechanism, the tape-loading mechanism and the tape-driving mechanism together in such a way that they can be driven or controlled by the same motor. If these mechanisms are combined in this way, the number of structural components can be reduced, so that a small-sized, light-in-weight VTR can be obtained.

Among various VTRs actually developed to date, there is a type wherein the capstan motor is used for driving both the front loading mechanism and the tape-driving mechanism (which includes not only a capstan shaft but also reel bases, etc.). This type of VTR operates as follows. The front loading mechanism moves the cassette to the predetermined loading position by utilization of the torque transmitted thereto from the capstan motor. Next, the tape-loading mechanism (which is driven by a motor different from the capstan motor, i.e., by a loading motor used for rotating mode cams) pulls the tape out of the cassette. Thereafter, the torque of the capstan motor is transmitted to the tape-driving mechanism (e.g., reel bases) in accordance with the user's operation.

In this type of VTR, the torque of the capstan motor is transmitted to the tape-driving mechanism (particularly, to the reel bases) whenever a driving force is transmitted to the front loading mechanism. This means that the tape take-up real of the real bases is rotated in the tape-winding direction when the front loading mechanism is operating. When the cassette has been loaded at the predetermined loading position (i.e., when the reel shaft-engaging hoes of the cassette have been brought into engagement with the reel shafts standing on the reel bases), the capstan motor is stopped, whereby the VTR is set in a standby condition, waiting for the user's next operation.

In the first state of the VTR (the first state being a state immediately after the cassette is loaded to the predetermined loading position), the tape take-up reel side of the cassette immediately stops since the capstan motor which drives the tape take-up reel is applied with a braking force during the first state. However, the tape-supply reel side of the cassette continues to rotate for some time, due to the moment of inertia, so that the tape is fed more than necessary, causing tape slack.

If tape slack is caused, the tape disengages from the slanted post and guide roller of the tape-pulling members, and thus drops. If the tape is pulled out of the cassette in this condition, it may happen that the tape will be brought into contact with the flanges of the slanted post and the guide roller, resulting in damage to the tape. It may also happen that the tape will fall in the gap between the chassis and the base member (by which the slanted post and the guide roller are supported), with the result that the tape may be stained with grease or cut. If the tape is stained with grease, this grease may attach also to the components of the tape-driving system, disabling the tape-driving system.

When, in the above-mentioned first state, the cassette is raised to return it to the cassette insertion port, the torque of the capstan motor is transmitted to the tape-supply reel in such a manner as to rotate the tape-supply reel in the tape-rewinding direction. If the tape is wound around the tape take-up reel at the time, the tape may slacken and overlap at the portions located inside the cover of the cassette.

SUMMARY OF THE INVENTION

Accordingly, an object of the present invention is to provide a cassette tape slack-preventing apparatus which prevents a tape from slackening when the cassette of the tape engages with the reel shafts or disengages therefrom.

This object is achieved by a cassette tape slack-preventing apparatus for preventing slack of a cassette tape used in a magnetic recording/reproducing apparatus. The magnetic recording/reproducing apparatus comprises: a capstan motor; supply and take-up reel bases having reel shafts adapted for engagement with reel-engaging holes of a tape cassette; a front loading mechanism for transporting the tape cassette and bringing the reel-engaging holes of the tape cassette into engagement with the reel shafts of the reel bases, and for disengaging the tape cassette from the reel shafts of the reel bases and transporting the tape cassette back to an original position; a clutch mechanism for selectively transmitting torque of the capstan motor to the front loading mechanism; and a tape-driving mechanism for selectively transmitting the torque of the capstan motor to one of the supply and take-up reel bases. The cassette tape slack-preventing apparatus comprises: detection means for detecting an operating condition of the front loading mechanism; and a braking mechanism for braking at least one of the supply and take-up reel bases when the detection means detects the operating condition of the front loading mechanism, whereby the cassette tape is prevented from slackening in both first and second states, the first state being a state immediately after the reel-engaging holes of the tape cassette are brought into engagement with the reel shafts of the reel bases and the second state being a state when the reel-engaging holes are disengaged from the reel shafts.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

One embodiment of the present invention will now be described, with reference to the accompanying drawings.

Figure 1A:
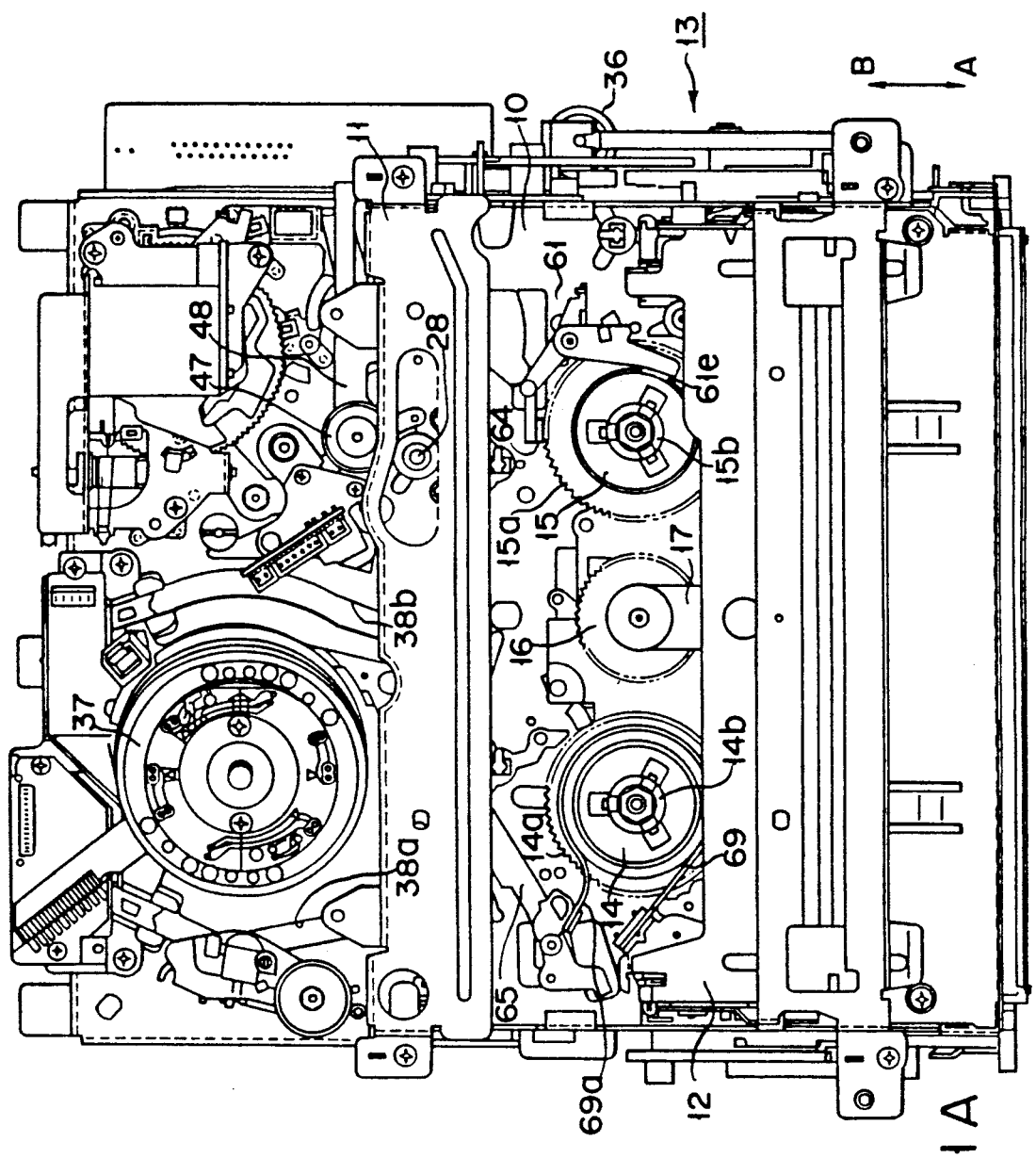
FIGS. 1A-1C are top, side and bottom views, respectively, of a VTR (i.e., a magnetic recording/reproducing apparatus) to which a tape slack-preventing apparatus according to the first embodiment of the present invention is applied.
Figure 1B:
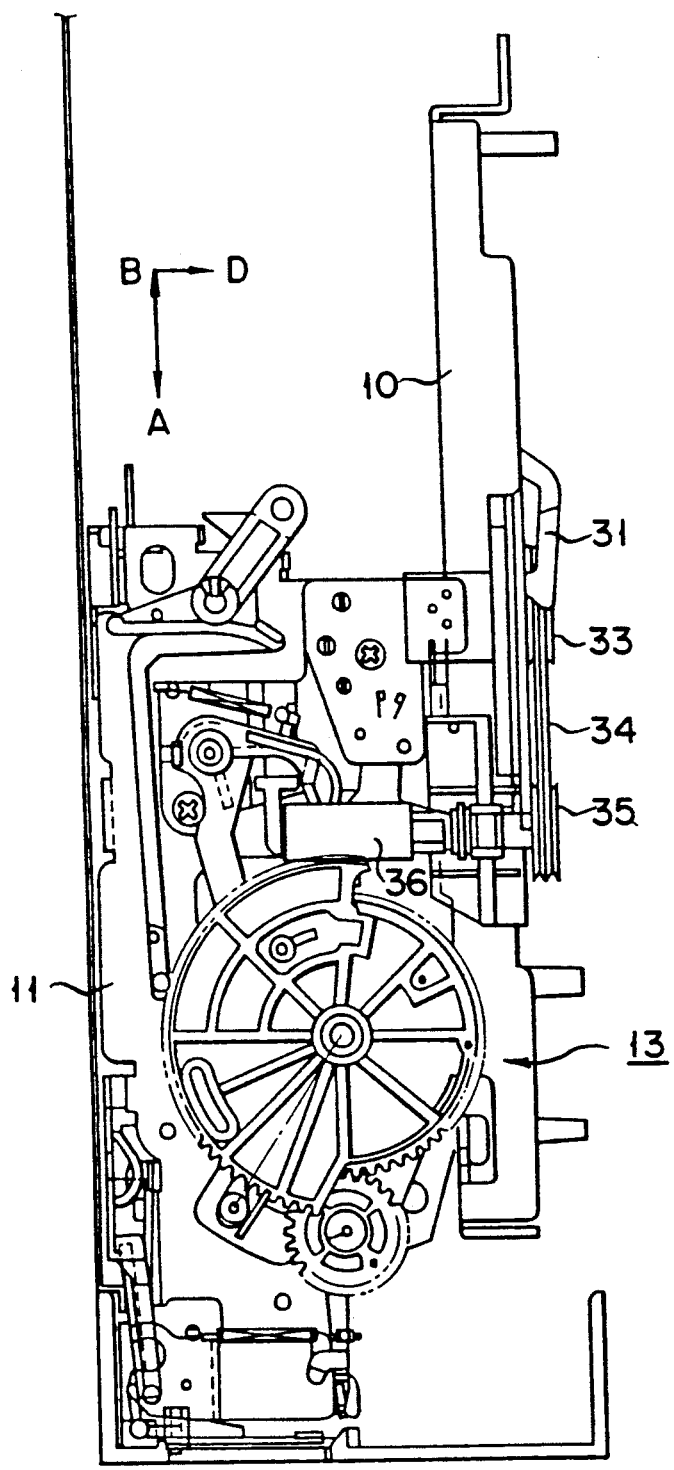
Figure 1C:
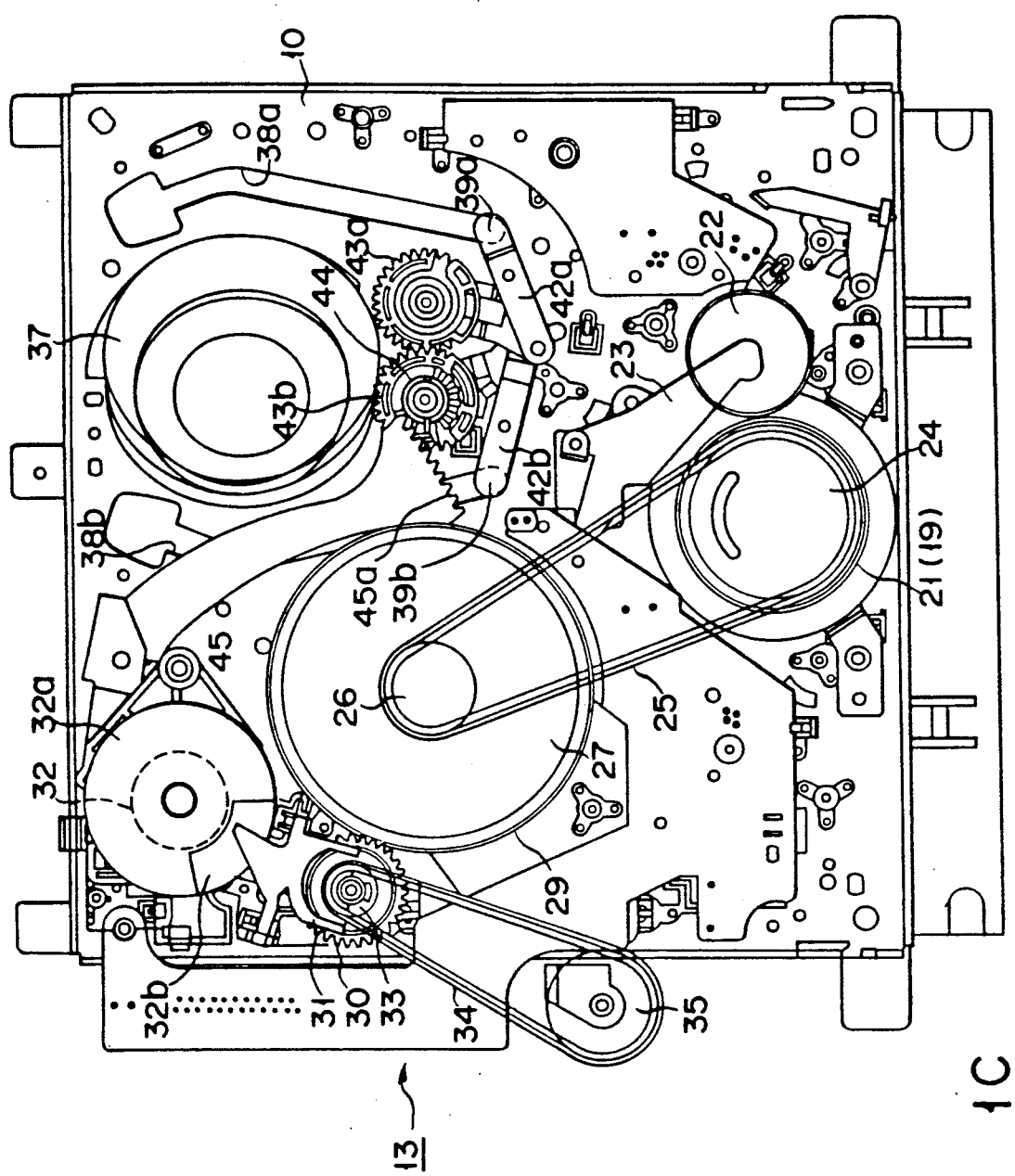

FIGS. 1A, 1B and 1C are top, side and bottom views, respectively, of a VTR to which a cassette tape slack-preventing mechanism of the present invention is applied. Referring to the Figures, frame member 11 is coupled to one end of main chassis 10. Cassette holder 12 is supported by frame member 11 such that it is movable in the directions indicated by arrows A, B and D (the direction indicated by arrow D is perpendicular to the directions indicated by arrows A and B). Cassette holder 12 is adapted to receive cassette C (which is not shown in FIGS. 1A, 1B and 1C, for simplicity) when it is located at the cassette insertion port. In response to the insertion of cassette C into cassette holder 12, front loading mechanism 13 is automatically driven. This front loading mechanism moves cassette holder 12 in direction B, together with cassette C inserted therein, until cassette holder 12 reaches a predetermined position. Then, front loading mechanism 13 moves cassette holder 12 in direction D. As a result, cassette C is fitted on supply and take-up reel bases 14 and 15, which are parts of a tape-driving mechanism.

Gears 14a and 15a are coupled to reel bases 14 and 15, respectively. Driving gear 16 constituting part of the tape-driving mechanism is located between gears 14a and 15a. This driving gear 16 is supported by one end of swing member 17.

Figure 2:
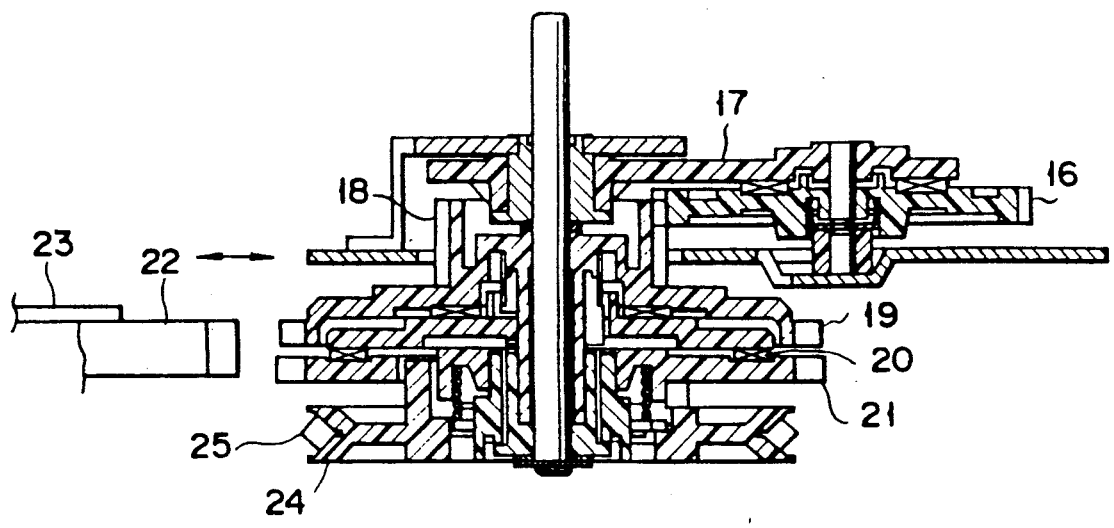
FIG. 2 is a sectional view of a clutch gear mechanism.

As is shown in FIG. 2, gear 18, which is in mesh with driving gear 16, is attached to the other end of swing member 17. First clutch gear 19, which is part of a clutch gear mechanism, is arranged coaxial with gear 18. Second clutch gear 21, which is also part of the clutch gear mechanism, is stacked upon first clutch gear 19, with friction member 20 interposed therebetween. Clutch-switching gear 22 is arranged in such a manner as to face both gears 19 and 21. Clutch-switching gear 22 can be brought into contact with the first and second clutch gears 19 and 21, and can be moved away from them. Clutch-switching gear 22 is swung by change-over lever 23 (which interlocks with an operation mode-switching mechanism), such that it is selectively brought into mesh with both clutch gears 19 and 21. Pulley 24 is arranged coaxial with second clutch gear 21, and driving belt 25 is wound around pulley 24.

As is shown in FIG. 1C, driving belt 25 is wound around driving pulley 26. This driving pulley 26 is fitted on the rotating shaft of capstan motor 27. Therefore, the driving force of capstan motor 27 is transmitted first to pulley 24 via driving belt 25, and then to second clutch gear 21. Capstan shaft 28 is arranged coaxial with capstan motor 27.

Figure 3:
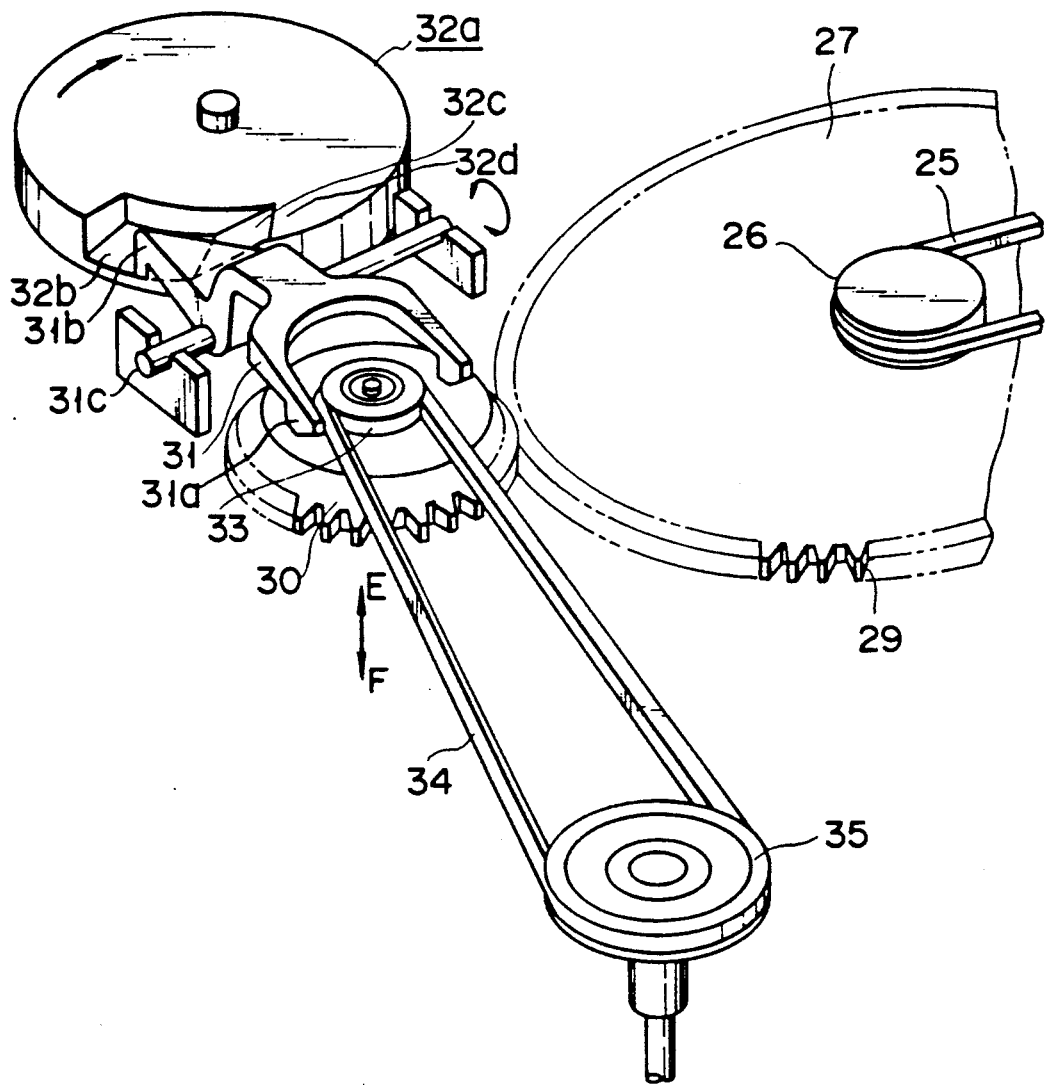
FIG. 3 is a perspective view of a switching mechanism.

A clutch mechanism is provided for capstan motor 27 mentioned above. The clutch mechanism serves to selectively transmit the torque of capstan motor 2 to front loading mechanism 13. More specifically, driving gear 29 is fitted around the periphery of the rotating member of capstan motor 27, as is shown in FIG. 3. Vertically-movable gear 30 is arranged such that it faces driving gear 29. As will be detailed later, vertically-movable gear 30 is designed to transmit its torque to front loading mechanism 13. First end 31a of vertically-swingable switch lever 31 is in contact with the upper side of vertically-movable gear 30. Second end 31b of the switch lever 31 engageable with one side of first mode-switching cam 32a, which is one of the mode-switching cams coaxial with the operation mode-switching mechanism.

First mode-switching cam 32a has step portion 32b which is in the form of a circular arc having predetermined size. Slanted portion 32c is formed in that end of step portion 32b which is located downstream with reference to the rotating direction of first mode-switching cam 32a. Slanted portion 32c is formed in such a manner that step portion 32b is smoothly connected to surface 32d of first mode-switching cam 32a.

With this construction, second end 31b of switch lever 31 engages with one of step portion 32b, slanted portion 32c and surface 32d of first mode-switching cam 32a in accordance with the rotation of this cam 32a. As a result of this engagement, first end 31a of switch lever 31 swings in the axial direction of vertically-movable gear 30, with rotatable shaft 31c as a center of swing.

Figure 4A:
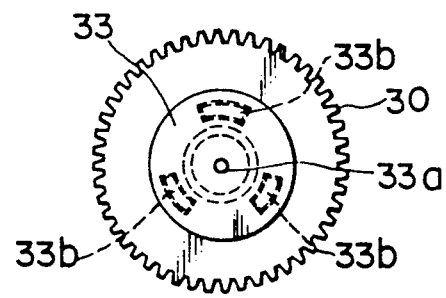
FIGS. 4A and 4B are top and bottom views, respectively, illustrating both a pulley and a vertically-movable gear.
Figure 4B:
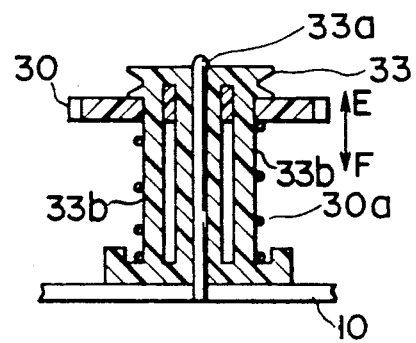

As is shown in FIGS. 4A and 4B, vertically-movable gear 30 is coaxial with pulley 33, and this pulley 33 is coupled to main chassis 10 such that it is rotatable around shaft 33a. Vertically-movable gear 30 is located around pulley 33 and is urged toward pulley 33 in the axial direction of shaft 33a by spring 30a. The rotation of vertically-movable gear 30 is transmitted to pulley 33 through stop members 33b. That is, vertically-movable gear 30 and pulley 33 are rotatable in the same direction.

Driving belt 34 is wound around both pulley 33 and pulley 35. As is shown in FIG. 1C, pulley 35 is coaxial with worm 36 of front loading mechanism 13.

At the time of loading tape cassette C, second end 31b of switch lever 31 engages with step portion 32b, due to the rotation of first mode-switching cam 32a. Therefore, first end 31a of switch lever 31 is separated from vertically-movable gear 30. As a result, vertically-movable gear 30 is raised (in the direction E) by the urging force of spring 30a and brought into mesh with driving gear 29. Thus, the rotation of capstan motor 27 is transmitted to front driving mechanism 13 through vertically-movable gear 30, pulley 33, driving belt 34, pulley 35 and worm 36, whereby front driving mechanism 13 performs the loading of cassette holder 12.

When the loading of cassette C is completed, first mode-switching cam 32a is rotated, and second end 31b of switch lever 31 engages with surface 32d after sliding along slanted portion 32c. Therefore, first end 31a of switch lever 31 contacts vertically-movable gear 30 and pushes this gear downward. As a result, vertically-movable gear 30 is moved downward in the direction F in spite of the urging force of spring 30a. Thus, the rotation of pulley 33 is stopped, and the loading of cassette holder 12 is stopped, accordingly.

Loading motor 32 is designed to drive not only first mode-switching cam 32a mentioned above but also the other mode-switching cams.

As is shown in FIG. 1A, helical scan type cylinder 37 having magnetic heads (not shown) is rotatably coupled to main chassis 10 mentioned above. Around this cylinder 37, first and second guide holes 38a and 38b (which are parts of a tape-loading mechanism) are provided such that the two guide holes correspond in location to the tape inlet and outlet sides, respectively.

Figure 5A:
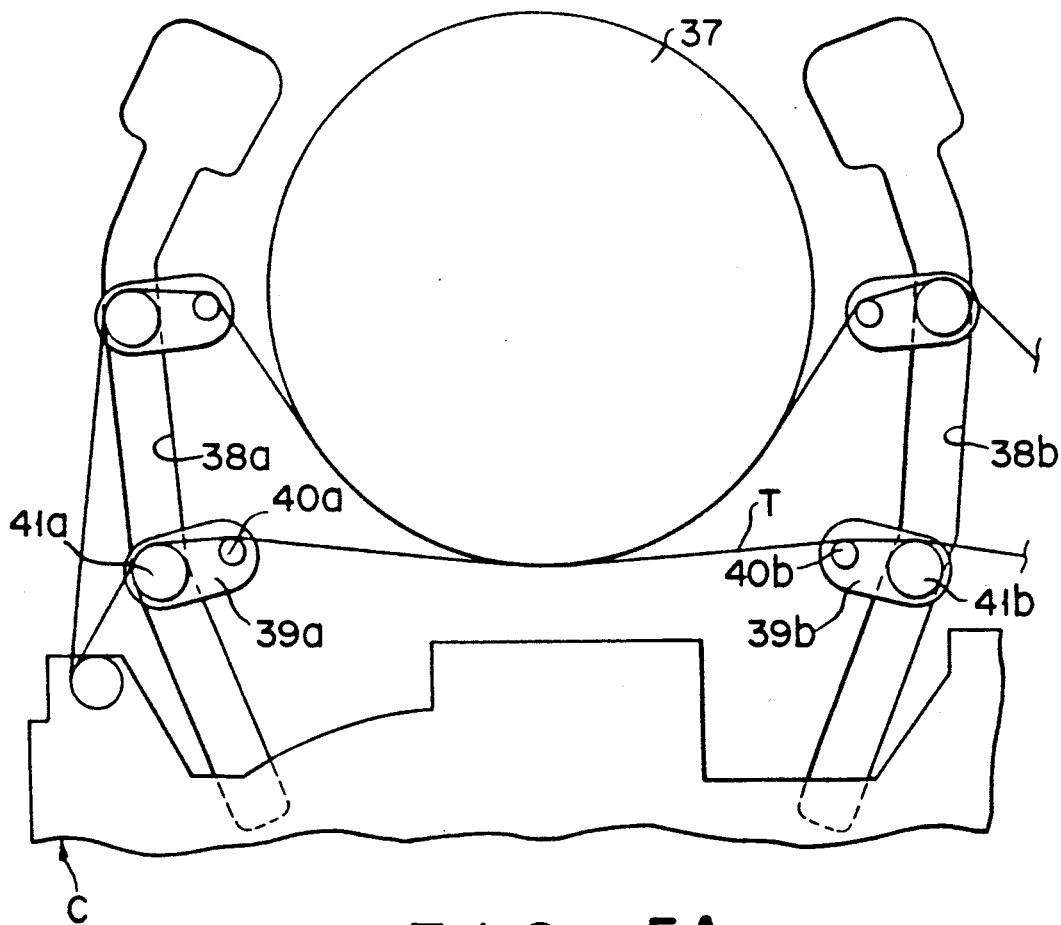
FIGS. 5A and 5B are top and bottom views, respectively, illustrating a tape-loading mechanism.

As is shown in FIG. 5A, first and second tape-pulling members 39a and 39b are fitted in first and second guide holes 38a and 38b, respectively, such that they are movable within the guide holes. Slanted post 40a substantially parallel to cylinder 37 and guide roller 41a substantially perpendicular to main chassis 10 are provided for first tape-pulling member 39a such that they are located side by side with reference to each other. Likewise, slanted post 40b substantially parallel to cylinder 37 and guide roller 41b substantially perpendicular to main chassis 10 are provided for second tape-pulling member 39b such that they are located side by side with reference to each other.

Figure 5B:
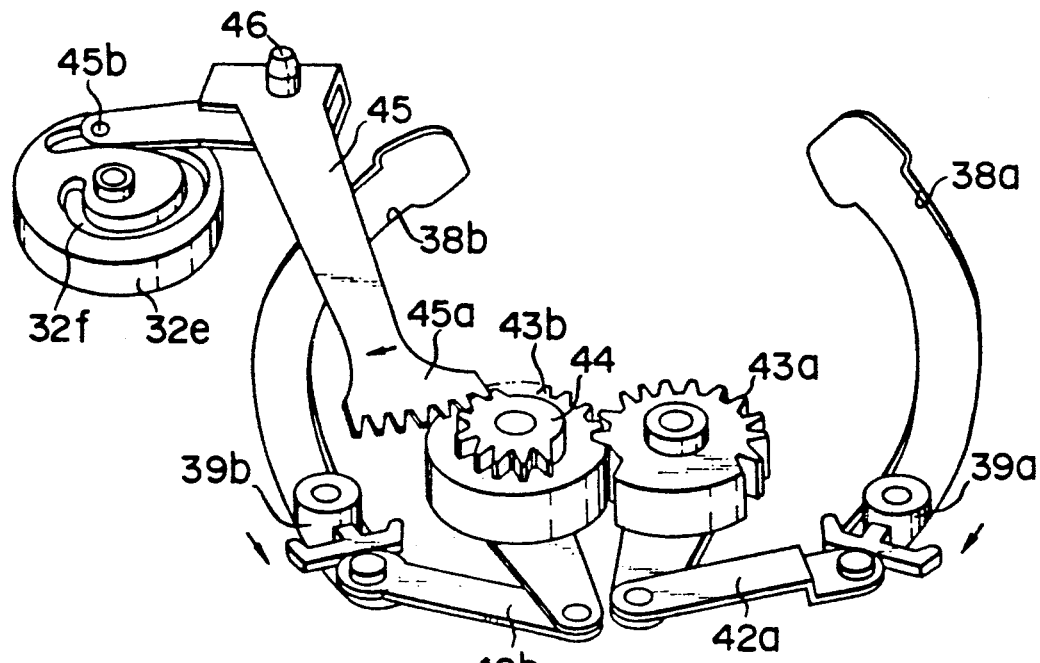

As is shown in FIG. 5B, the one-end portions of first and second links 42a and 42b are coupled to the proximal ends of first and second tape-pulling members 39a and 39b, respectively. The other-end portions of first and second links 42a and 42b are supported by first and second driving gears 43a and 43b, respectively, which are in mesh with each other. Half-gear 44 is arranged coaxial with second driving gear 43b. Sectorial gear 45a formed at one end of driving lever 45 is in mesh with half-gear 44. An intermediate point of driving lever 45 is swingably supported by main chassis 10 by means of shaft 46. Pin 45b located at the other end of driving lever 45 engages with cam groove 32f formed in second mode-switching cam 32e, and this cam 32e is rotated within a predetermined angular range by loading motor 32. Therefore, driving lever 45 is driven by the movement of second mode-switching cam 32e, and transmits the driving force to first and second tape-pulling members 39a and 39b, through half-gear 44, first and second driving gears 43a and 43b, and first and second links 42a and 42b, whereby performing tape loading.

As is shown in FIG. 1A, pinch roller 47, which is part of the tape-driving mechanism, is arranged on main chassis 10 such that it is located in the neighborhood of capstan shaft 28 mentioned above. Pinch roller 47 is swingably supported by one end of pinch lever 48. Pinch lever 48 is swung in association with the above-mentioned mode-switching cams by a linking mechanism (not shown). As a result of the swing of pinch lever 48, pinch roller 47 supported at one end of lever 48 is pressed against capstan shaft 28, with tape T interposed.

Figure 6:
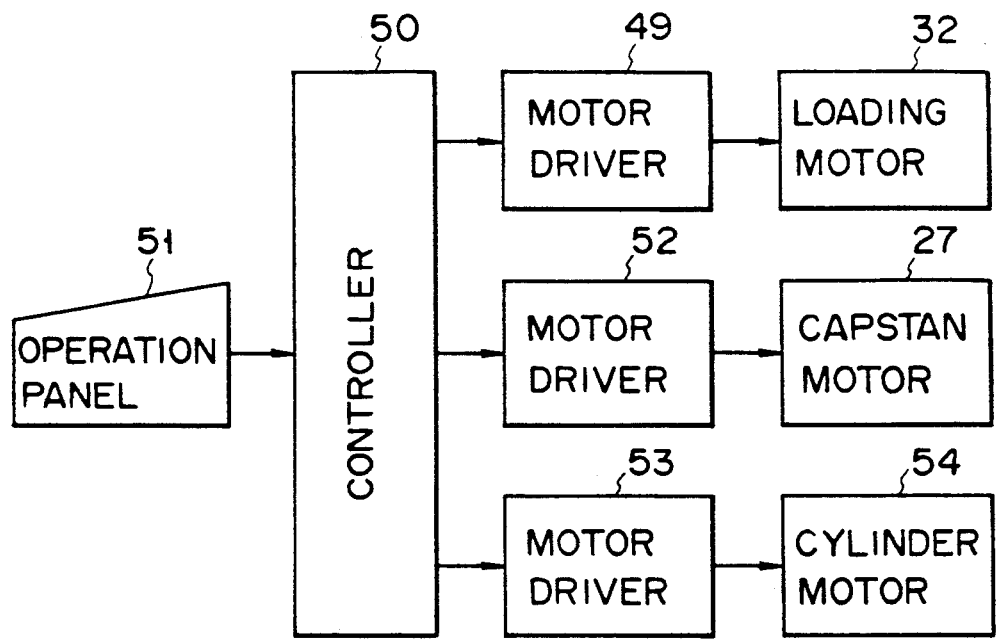
FIG. 6 is a block circuit diagram of the electric circuit of the VTR.

First and second mode-switching cams 32a and 32e mentioned above are coaxial with the other mode-switching cams (not shown). All these mode-switching cams are rotated within the same angular range by loading motor 32, and their angles of rotation are determined in accordance with the operation modes of the VTR. As is shown in FIG. 6, loading motor 32 is driven by motor driver 49 under the control of controller 50. In accordance with the user's operation of control panel 51, controller 50 determines an operation mode of the VTR. Controller 50 causes the mode-switching cams to be rotated by the angle corresponding to the determined operation mode. Further, controller 50 controls motor driver 52 in accordance with the determined operation mode, to thereby drive capstan motor 27. The torque of capstan motor 27 is selectively transmitted to capstan shaft 28, reel base 14 located on the tape supply side, reel base 15 located on the tape take-up side, etc. Still further, controller 50 controls motor driver 53 in accordance with the determined operation mode, to thereby drive cylinder motor 54 to rotate cylinder 37.

In the VTR having the above-mentioned construction, loading motor 32 is driven and first mode-switching cam 32a is rotated, in response to the insertion of tape cassette C into cassette holder 12. First mode-switching cam 32a actuates switch lever 31 in such a manner that vertically-movable gear 30 is brought into mesh with driving gear 29. After first mode-switching cam 32a is rotated by a first predetermined angle, loading motor 32 is stopped, with the mesh between vertically-movable gear 30 and driving gear 29 maintained. Simultaneous with this, capstan motor 27 is driven, and the driving force of this motor is transmitted to front loading mechanism 13 through driving gear 29, vertically-movable gear 30, pulley 33, driving belt 34, pulley 35, and worm 36, as mentioned above. Thus, tape cassette C is mounted on reel bases 14 and 15.

After the cassette loading is completed in the above manner, loading motor 32 is driven again, and first mode-switching cam 32a is rotated by a second predetermined angle. In accordance with this rotation, switch lever 31 is swung in the reverse direction E, causing vertically-movable gear 30 to separate from driving gear 29. Simultaneous with this, second mode-switching cam 32e coaxial with first mode-switching cam 32a is also rotated by the second predetermined angle, whereby first and second tape-pulling members 39a and 39b are driven to perform tape loading.

Thereafter, first and second mode-switching cams 32a and 32e, and other mode-switching cams (not shown) which are coaxial with first and second mode-switching cams 32a and 32e are rotated by the angle corresponding to a desirable operating mode. In accordance with this rotation of the cams, an operating mode-switching mechanism (not shown) is driven such that the tape-driving mechanism is selectively switched into one of the operating modes, such as the play mode, fast-forward mode, fast-rewind mode, etc.

As mentioned above, vertically-movable gear 30 is moved in the axial direction thereof, with reference to driving gear 29 driven by capstan motor 27, and the movement of gear 30 is controlled by switch lever 31 which is moved in association with the driving of first mode-switching cam 32a. In this manner, the driving force of driving gear 29 is selectively transmitted to front loading mechanism 13 through vertically-movable gear 30. Thus, the cassette-loading operation can be controlled with high accuracy by utilization of the driving force of capstan motor 27. Since the number of structural components of the VTR can be reduced while maintaining the highly-accurate operation of the front loading mechanism, the size and weight of the VTR can be reduced to the possible degree.

Figure 7:
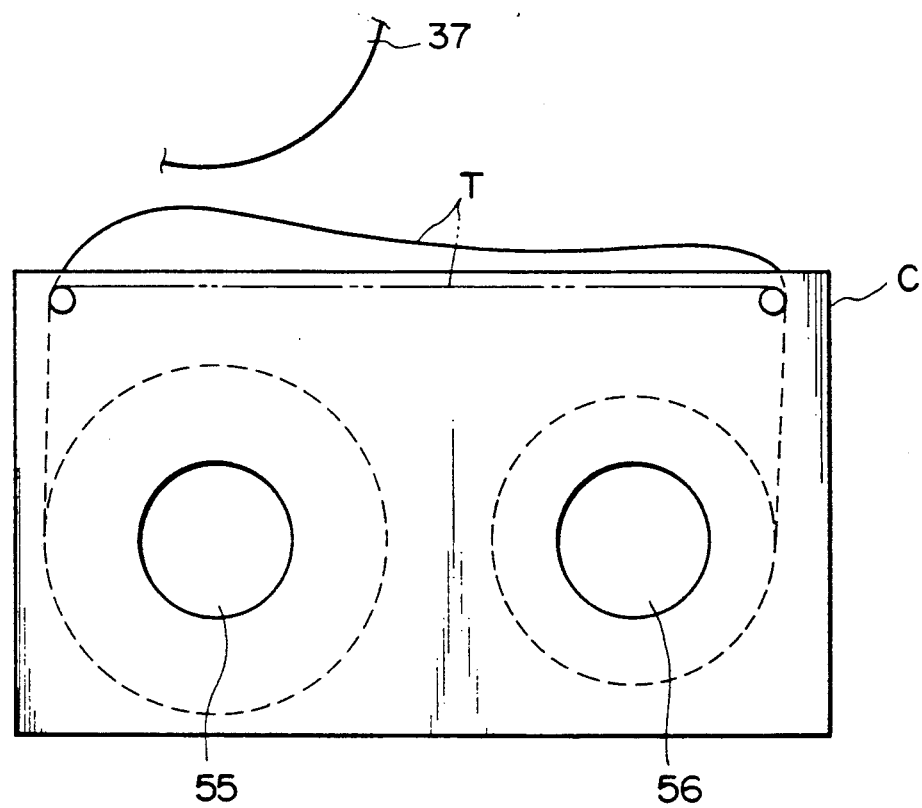
FIG. 7 is a view illustrating a slack cassette tape.

As is shown in FIGS. 1C and 3, capstan motor 27 is constantly connected to either reel base 14 or reel base 15 through such a clutch mechanism as is shown in FIG. 2. Due to this, the VTR may be faced with the problem mentioned above if it does not employ the cassette tape slack-preventing apparatus of the present invention. Specifically, in the first state of the VTR (i.e., the state immediately after tape cassette C is loaded at the predetermined loading position, in other words, the state immediately after reel shaft-engaging holes 55 and 56 of cassette C engage with reel shafts 14b and 15b of reel bases 14 and 15), tape T may be fed from cassette C, due to the rotation of tape-supply reel base 14 caused by the moment of inertia, and thus slackens, as is indicated by the solid lines in FIG. 7. Further, in the second state of the VTR (i.e., the state where cassette C in the first state has just been raised to return it to the cassette insertion port), tape T may be fed from cassette C, due to the rotation of tape take-up reel base 15 caused by the moment of inertia, and thus slackens. However, the cassette tape slack-preventing apparatus incorporated in the VTR prevents tape T from slacking in both the first and second states and maintains tape T in the condition indicated by the one-dot-chain lines in FIG. 7. A detailed description will now be given of this cassette tape slack-preventing mechanism.

Figure 8:
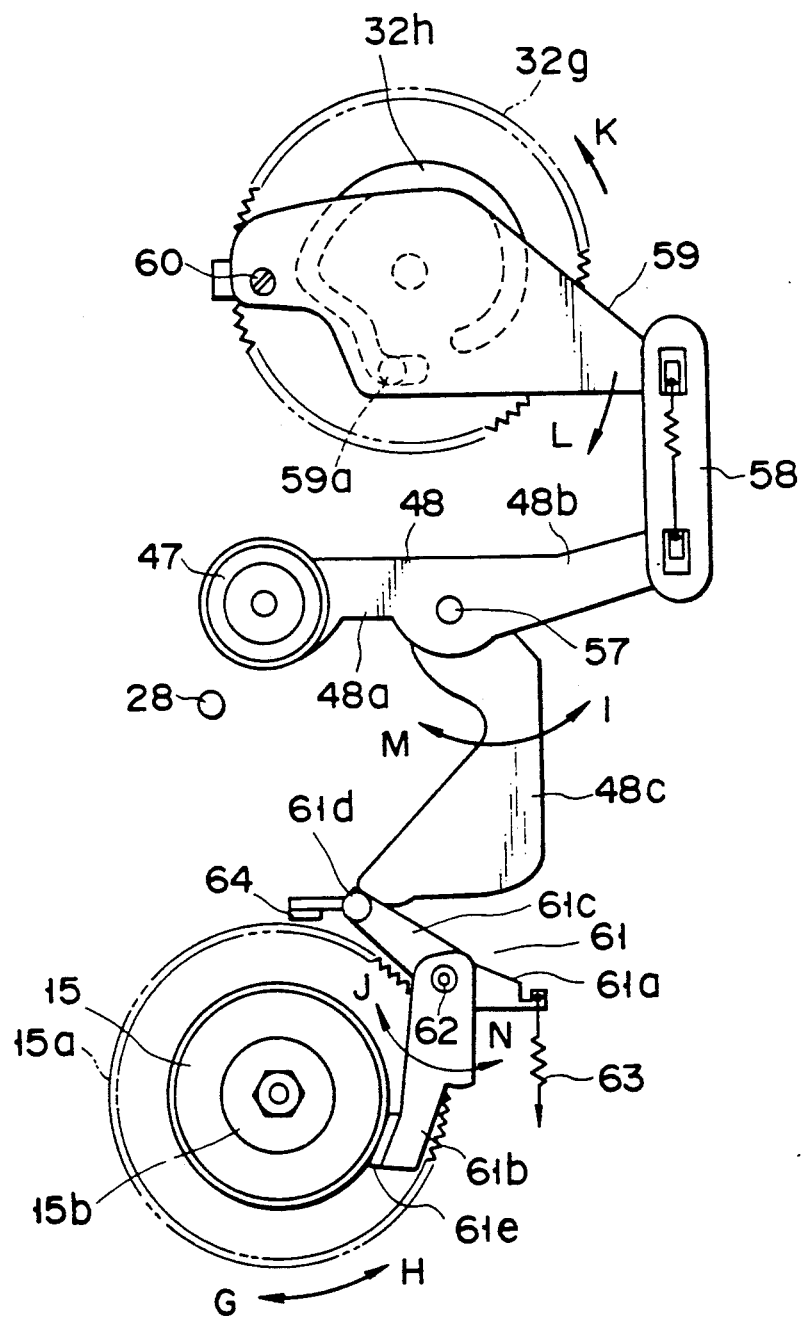
FIG. 8 is a view illustrating the construction of the cassette tape slack-preventing apparatus of the first embodiment.

FIG. 8 shows the manner in which the cassette tape slack-preventing apparatus of the first embodiment of the present invention is applied to tape take-up reel base 15 of the VTR. Referring to FIG. 8, pinch lever 48 is coupled to main chassis 10 by means of shaft 57. This pinch lever 48 includes a plurality of arm portions 48a, 48b and 48c extending in different directions. Pinch roller 47 mentioned above is supported by the upper side of the tip end of arm portion 48a. The first end of coupling lever 58 engages with the tip end of arm portion 48b, while the second end of coupling lever 58 engages with the tip end of cam 59 whose rotational position is varied in accordance with the rotation of third mode-switching cam 32g. Cam 59 is rotatable, with immovable support shaft 60 as the center of rotation. Cam 59 includes pin 59a which is in engagement with cam section 32h formed in third mode-switching cam 32g. Third mode-switching cam 32g is arranged coaxial with both first and second mode-switching cams 32a and 32e. Loading motor 32 rotates these mode-switching cams by the same angle in accordance with the operating mode of the VTR, as mentioned above.

Arm portion 48c of pinch lever 48 extends toward brake member 61 of reel base 15. Brake member 61 includes arm portions 61a, 61b and 61c and is swingably supported by immovable shaft 62. Reel base 15 is rotated in the direction indicated by arrow G in FIG. 8 when the VTR is in the play, recording, or fast forward mode, while it is rotated in the opposite direction indicated by arrow H when the VTR is in the fast rewind mode. Reverse brake pad 61e attached to arm portion 61b of brake member 61 is located in opposition to the circumferential brake face of reel base 15. Spring 63 is coupled to arm portion 61a of brake member 61. Normally, brake member 61 is pulled by spring 63, so that reverse brake pad 61e attached to arm portion 61b is elastically pressed against the circumferential brake face of reel base 15.

Arm portion 61c of brake member 61 is provided with brake pad 64 at the tip end thereof. Brake pad 64 is located in opposition to the circumferential face of gear 15a. Boss 61d is formed at arm portion 61c, and arm portion 48c of pinch lever 48 is located in opposition to boss 61d.

In the state shown in FIG. 8, pinch roller 47 is located away from capstan shaft 28. In this state, reverse brake pad 61e of brake member 61 is in slight contact with reel base 15.

When pinch roller 47 is pressed against capstan shaft 28 (e.g., at the time of the play or the recording mode of the VTR), pinch lever 48 swings in direction I indicated in FIG. 8, whereby its arm portion 48c allows arm portion 61c of brake member 61 to swing in direction J indicated in FIG. 8. Therefore, brake member 61 is pulled by spring 63, and reverse brake pad 61e is pressed against reel base 15. In this state, reel base 15 can be smoothly rotated in the tape winding direction, but is applied with a great braking force in the reverse direction (i.e., in the tape-rewinding direction).

When the front loading mechanism is operating, third mode-switching cam 32g is rotated in direction K indicated in FIG. 8. Therefore, cam 59 is rotated in direction L, and pinch lever 48 swings in direction M. Accordingly, arm portion 48c of pinch lever 48 is pressed tightly against boss 61d of brake member 61, causing brake member 61 to swing in direction N.

Due to the operation mentioned above, brake pad 64 is forcibly pressed against gear 15a of reel base 15 when the front loading mechanism is operating. Since the rotation of reel base 15 of the tape take-up side is prevented, tape T is prevented from undesirably feeding from tape-supply reel base 14 when cassette C is fitted on reel bases 14 and 15.

The cassette tape slack-preventing apparatus of the first embodiment employs a brake mechanism which forcibly applies a braking force to tape take-up reel base 15 when the front loading mechanism is operating. However, the braking force may be forcibly applied to tape-supply reel base 14. In other words, the brake mechanism may be provided for tape-supply reel base 14.

Figure 9:
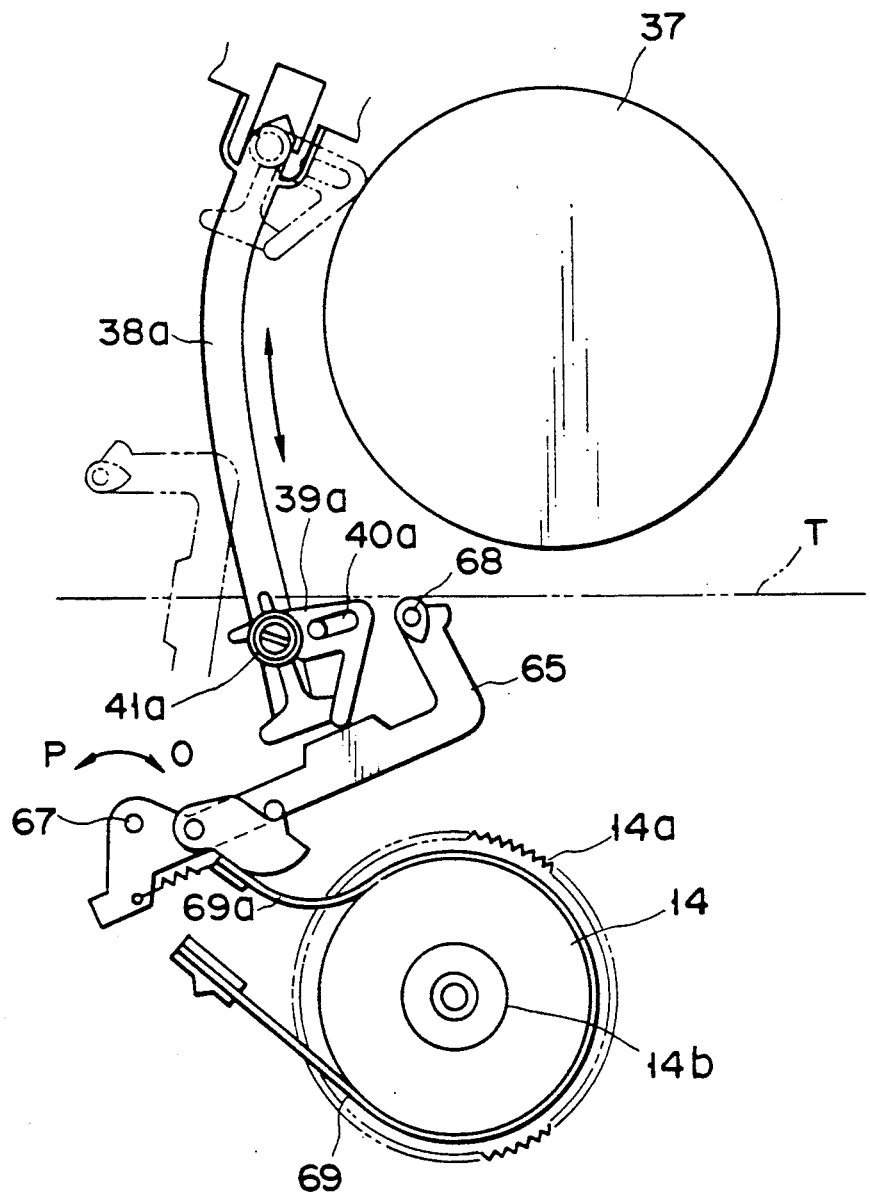
FIG. 9 is a view illustrating the construction of a cassette tape slack-preventing apparatus according to the second embodiment of the present invention.

FIG. 9 illustrates the construction of a cassette tape slack-preventing apparatus according to the second embodiment of the present invention. This apparatus is designed to forcibly apply a braking force to tape-supply reel base 14. Referring to FIG. 9, tension lever 65 for applying tension to tape T is arranged between first guide hole 38a and reel base 14. One end of tension lever 65 is swingably attached to main chassis 10 by means of shaft 67, while the other end has tension pole 68 standing upright thereon. The state shown in FIG. 9 is a state where the front loading has been completed or where tape T has been returned into the interior of cassette C by tape unloading. When tape T is pulled out of cassette C and brought into contact with cylinder 37, tension lever 65 swings to the position indicated by the one-dot-chain lines in FIG. 9, with shaft 67 as a center. Tension lever 65 is driven by a mode-switching mechanism (not shown) to which a driving force is transmitted from a mode-switching cam. Simultaneous with the swing of tension lever 65, first tape-pulling member 39a moves along first guide hole 38a to the position indicated by one-dot-chain lines in FIG. 9. Accordingly, tape T is brought into contact with the circumference of cylinder 37. When tape T is unloaded, the opposite operation to that mentioned above is performed. Specifically, first tape-pulling member 39a is returned to the position indicated by the solid lines in FIG. 9; likewise, tension lever 65 is returned to the position indicated by the solid lines in FIG. 9.

In the second embodiment, first tape-pulling member 39a is designed to operate on tension lever 65. As can be understood from the state shown in FIG. 9, first tape-pulling member 39a continues to forcibly push and swing tension lever in direction O, immediately before the tape loading is performed.

The operation of tension lever 65 is related with that of brake band 69 wound around the circumferential face of reel base 14. More specifically, even when tape T is not applied with tension, tension lever 65 pulls end 69a of brake band 69, to thereby tighten brake band 69 around reel base 14. Thus, reel base 14 is kept applied with a great braking force until the tape loading illustrated in FIG. 9 is performed, i.e., until the end of the front loading. Therefore, tape T prevented from slackening when the slot-in operation has just been performed.

The primary function of tension lever 65 is to maintain the tape tension at a constant value and control the movement of reel base 14. Specifically, tension lever 65 applies tension to tape T when it is located at the position indicated by the one-dot-chain lines in FIG. 9. If, in this condition, the rotation of reel base 14 becomes faster and tape T is fed more than necessary, tension lever 65 swings in direction P, due to the elastic force of a spring or the like. Thus, the tape tension is maintained at a constant value. Simultaneous with the swing of tension lever 65, brake band 69 is pulled, whereby reel base 14 is applied with a braking force. In the second embodiment, tension lever 65 having this primary function is also designed such that it can forcibly apply a braking force to reel base 14 by utilization of the movement of tape-pulling member 39a.

As mentioned above, the cassette tape slack-preventing apparatus of the invention is employed in a magnetic recording/reproducing apparatus of a type wherein the capstan motor is used for driving the front loading mechanism and for rotating the reel bases, and comprises a braking mechanism which forcibly arrests the rotation of the reel bases when the front loading mechanism is operating. Due to the action of the braking mechanism, the rotation of the reel bases is arrested during the slot-in operation, and tape T is prevented from being undesirably fed immediately after the completion of the slot-in operation (i.e., immediately after reel shaft-engaging holes 55 and 56 of cassette C are fitted around reel shafts 14b and 15b of reel bases 14 and 15, respectively).

The braking mechanism of the present invention may be embodied in various manners. Any type of braking mechanism can be employed as long as it can forcibly apply a braking force to the reel bases during the operation of the front loading mechanism. In addition, a braking force may be applied to one or both of the take-up and supply reel bases.

Additional advantages and modifications will readily occur to those skilled in the art. Therefore, the invention in its broader aspects is not limited to the specific details, representative devices, and illustrated examples shown and described. Accordingly, departures may be made from such details without departing from the spirit or scope of the general inventive concept as defined by the appended claims and their equivalents.

What is claimed is:

1. A cassette tape slack-preventing apparatus for preventing slack of a cassette tape used in a magnetic recording/reproducing apparatus which comprises: a capstan motor; supply and take-up reel bases having reel shafts adapted for engagement with reel-engaging holes of a tape cassette; a front loading mechanism for transporting the tape cassette and engaging the reel-engaging holes of the tape cassette with the reel shafts of the reel bases, and for disengaging the tape cassette from the reel shafts of the reel bases and transporting the tape cassette back to an original position; a clutch mechanism for selectively transmitting torque of the capstan motor to the front loading mechanism; and a tape-driving mechanism for selectively transmitting the torque of the capstan motor to one of the supply or take-up reel bases, the tape-driving mechanism transmitting the torque to the one reel base when the front loading mechanism is operated, said cassette tape slack-preventing apparatus comprising:

detection means for detecting whether or not the front loading mechanism is operated by the capstan motor through the clutch mechanism; and a braking mechanism for braking at least one of the supply and take-up reel bases transmitting the torque of the capstan motor by the tape-driving mechanism during the operating of the front loading mechanism when the detection means detects the condition that the front loading mechanism is operated, whereby the cassette tape is prevented from slackening in both first and second states, the first state being a state immediately after the reel-engaging holes of the tape cassette are brought into engagement with the reel shafts of the reel bases, while the second state being a state where the reel-engaging holes are disengaged from the reel shafts.

2. The cassette tape slack-preventing apparatus according to claim 1, wherein said braking mechanism includes:

a brake pad located in opposition to a circumferential face of the take-up reel base; and pressing means for forcibly pressing the brake pad against the take-up reel base when the detection means detects the condition that the front loading mechanism is operated.

3. The cassette tape slack-preventing apparatus according to claim 2, wherein said detection means includes a plurality of mode-switching cams linked to the braking mechanism which are arranged coaxial with one another and whose angles of rotation are determined in accordance with various operating modes of the magnetic recording/reproducing apparatus; and said pressing means includes means, which is in engagement with one of the mode-switching cams, for forcibly pressing the brake pad against the take-up reel base when the mode-switching cams are rotated to an angular position corresponding to a mode in which the front loading mechanism should be operated.

4. The cassette tape slack-preventing apparatus according to claim 2, wherein said braking mechanism further includes:

a brake band wound around the circumferential face of the supply reel base; and tightening means for forcibly tightening the brake band around the supply reel base when the detection means detects the condition that the front loading mechanism is operated.

5. The cassette tape slack-preventing apparatus according to claim 4, wherein said detection cams linked to the braking mechanism which are arranged coaxial with one another and whose angles of rotation are determined in accordance with various operating modes of the magnetic recording/reproducing apparatus;

said magnetic recording/reproducing apparatus further includes a tape-pulling member for pulling the tape out of the tape cassette in a state where the reel-engaging holes of the tape cassette are engaged with the reel shafts of the supply and take-up reel bases, said tape-pulling member being driven in accordance with the rotation of the mode-switching cams and being kept undriven when the mode-switching cams are rotated to an angular position corresponding to a mode in which the front loading mechanism should be operated;

said brake band includes a first end which is fixed and a second end which is movable toward the fixed first end; and said tightening means includes a tension lever linked to the detecting means, which is swingable around a shaft and which is urged by the tape-pulling member to forcibly press the movable second end of the brake band toward the fixed first end when the mode-switching cams are rotated to the angular position corresponding to the mode in which the front loading mechanism should be operated.

6. The cassette tape slack-preventing apparatus according to claim 1, wherein said braking mechanism includes:

a brake band wound around the circumferential face of the supply reel base; and tightening means for forcibly tightening the brake band around the supply reel base when the detection means detects the operating condition of the front loading mechanism.

7. The cassette tape slack-preventing apparatus according to claim 6, wherein said detection means includes a plurality of mode-switching cams linked to the braking mechanism which are arranged coaxial with one another and whose angles of rotation are determined in accordance with various operating modes of the magnetic recording/reproducing apparatus;

said magnetic recording/reproducing apparatus further includes a tape-pulling member for pulling the tape out of the tape cassette in a state where the reel-engaging holes of the tape cassette are engaged with the reel shafts of the supply and take-up reel bases, said tape-pulling member being driven in accordance with the rotation of the mode-switching cams and being kept undriven when the mode-switching cams are rotated to an angular position corresponding to a mode in which the front loading mechanism should be operated;

said brake band includes a first end which is fixed and a second end which is movable toward the fixed first end; and said tightening means includes a tension lever which is swingable around a shaft and which is urged by the tape-pulling member to forcibly press the movable second end of the brake band toward the fixed first end when the mode-switching cams are rotated to the angular position corresponding to the mode in which the front loading mechanism should be operated.

* * * * *